(12) United States Patent
Fujiki

(10) Patent No.: US 7,219,116 B2
(45) Date of Patent: May 15, 2007

(54) DATA PROCESSING APPARATUS

(75) Inventor: Yuji Fujiki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 679 days.

(21) Appl. No.: 10/643,875

(22) Filed: Aug. 20, 2003

(65) Prior Publication Data

US 2004/0158596 A1    Aug. 12, 2004

(30) Foreign Application Priority Data

Aug. 21, 2002  (JP) ............................. 2002-240182

(51) Int. Cl.
*G06F 7/38* (2006.01)
(52) U.S. Cl. ...................................... 708/490
(58) Field of Classification Search ................ 708/490
See application file for complete search history.

(56) References Cited

U.S. PATENT DOCUMENTS

2003/0177335 A1* 9/2003 Luick .......................... 711/210
2006/0294175 A1* 12/2006 Koob et al. ................. 708/490

FOREIGN PATENT DOCUMENTS

| JP | 51-147918 | 12/1976 |
|---|---|---|
| JP | 62-46493 | 2/1987 |
| JP | 63-241647 | 10/1988 |
| JP | 8-123420 | 5/1996 |
| JP | 08-147458 | 6/1996 |
| JP | 2001-154846 | 6/2001 |
| JP | 2002-007110 | 1/2002 |

* cited by examiner

*Primary Examiner*—Tan V. Mai
(74) *Attorney, Agent, or Firm*—Rabin & Berdo, P.C.

(57) ABSTRACT

A data processing apparatus includes address generation circuit, an address translation circuit, a selection circuit, a memory, a shifter, an ALU and a mixing circuit. The address generation circuit generates a logical address for data including 10 bit imaginary part, 10 bit real part and 12 bit reserved part. The address translation circuit translates the logical address into a physical address for data including 16 successive bits of the imaginary part and the real part. The selection circuit generates a selection signal in response to the logical address. The memory for storing 16 bits of data in accordance with the physical address. The shifter shifts the received data from the memory in response to the selection signal. The ALU processes an arithmetic operation in response to the shifter output. The mixing circuit mixes the data received from the memory and the ALU and outputs the mixed data to the memory.

16 Claims, 9 Drawing Sheets

FIG. 2

FIRST MEMORY BLOCK

| ADDRESS | 15 14 13 12 11 10 | 9 8 7 6 5 4 3 2 1 0 |
|---|---|---|
| 0 | R0 [5 : 0] | I0 [9 : 0] |
| 2 | R1 [5 : 0] | I1 [9 : 0] |
| 4 | R2 [5 : 0] | I2 [9 : 0] |
| 6 | R3 [5 : 0] | I3 [9 : 0] |
| 8 | R4 [5 : 0] | I4 [9 : 0] |
| 10 | R5 [5 : 0] | I5 [9 : 0] |
| 12 | R6 [5 : 0] | I6 [9 : 0] |
| 14 | R7 [5 : 0] | I7 [9 : 0] |
| 16 | R8 [5 : 0] | I8 [9 : 0] |
| 18 | R9 [5 : 0] | I9 [9 : 0] |
|  |  |  |
|  |  |  |

SECOND MEMORY BLOCK

| ADDRESS | 15 14 13 12 11 10 9 8 7 6 5 4 | 3 2 1 0 |
|---|---|---|
| 1 | RESERVED DATA | R0 [9 : 6] |
| 3 | RESERVED DATA | R1 [9 : 6] |
| 5 | RESERVED DATA | R2 [9 : 6] |
| 7 | RESERVED DATA | R3 [9 : 6] |
| 9 | RESERVED DATA | R4 [9 : 6] |
| 11 | RESERVED DATA | R5 [9 : 6] |
| 13 | RESERVED DATA | R6 [9 : 6] |
| 15 | RESERVED DATA | R7 [9 : 6] |
| 17 | RESERVED DATA | R8 [9 : 6] |
| 19 | RESERVED DATA | R9 [9 : 6] |
|  | RESERVED DATA |  |
|  | RESERVED DATA |  |

FIG. 3

FIRST MEMORY BLOCK

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | R0 [5:0] ||||||| I0 [9:0] |||||||||| ▲ |
| 2 | I2 [7:0] |||||||| ▲ | R1 [9:2] |||||||
| 4 | R3 [9:0] |||||||||| I3 [9:4] ||||||
| 6 | R5[1:0] || I5 [9:0] |||||||||| ▲ | R4 [9:6] ||||
| 8 | I7 [3:0] |||| ▲ | R6 [9:0] |||||||||| I6 [9:8] ||
| 10 | R8 [5:0] |||||| I8 [9:0] |||||||||| ▲ |
| 12 | I10 [7:0] |||||||| ▲ | R9 [9:2] |||||||

▲ : HEAD ADDRESS OF Ix

SECOND MEMORY BLOCK

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | R1[1:0] |||| I1 [9:0] |||||||||| ▲ | R0 [9:6] ||||
| 3 | I3 [3:0] |||| ▲ | R2 [9:0] |||||||||| I2 [9:8] ||
| 5 | R4 [5:0] |||||| I4 [9:0] |||||||||| ▲ |
| 7 | I6 [7:0] |||||||| ▲ | R5 [9:2] |||||||
| 9 | R7 [9:0] |||||||||| I7 [9:4] ||||||
| 11 | R9[1:0] || I9 [9:0] |||||||||| ▲ | R8 [9:6] ||||
| 13 | I11 [3:0] |||| ▲ | R10 [9:0] |||||||||| I10[9:8] ||

▲ : HEAD ADDRESS OF Ix

FIG. 4

| LOGICAL ADDRESS (a) | CALCULATION FORMULA: LOGICAL ADDRESS + (LOGICAL ADDRESS) >> 2 | PHYSICAL ADDRESS (A) |
|---|---|---|
| 0 | 0/2 + [ (0/2)/4 ] = 0 + 0 = 0 | 0 |
| 2 | 2/2 + [ (2/2)/4 ] = 1 + 0 = 1 | 1 |
| 4 | 4/2 + [ (4/2)/4 ] = 2 + 0 = 2 | 2 |
| 6 | 6/2 + [ (6/2)/4 ] = 3 + 0 = 3 | 3 |
| 8 | 8/2 + [ (8/2)/4 ] = 4 + 1 = 5 | 5 |
| 10 | 10/2 + [ (10/2)/4 ] = 5 + 1 = 6 | 6 |
| 12 | 12/2 + [ (12/2)/4 ] = 6 + 1 = 7 | 7 |
| 14 | 14/2 + [ (14/2)/4 ] = 7 + 1 = 8 | 8 |
| 16 | 16/2 + [ (16/2)/4 ] = 8 + 2 = 10 | 10 |
| 18 | 18/2 + [ (18/2)/4 ] = 9 + 2 = 11 | 11 |

FIG. 5

| LOGICAL ADDRESS (a) | LSB 2 BITS | CALCULATION FORMULA: LSB 2 BITS x 4 | SHIFT MAGNITUDE (B) |
|---|---|---|---|
| 0 | 0 | 0 x 4 = 0 | 0 |
| 2 | 1 | 1 x 4 = 4 | 4 |
| 4 | 2 | 2 x 4 = 8 | 8 |
| 6 | 3 | 3 x 4 = 12 | 12 |
| 8 | 0 | 0 x 4 = 0 | 0 |
| 10 | 1 | 1 x 4 = 4 | 4 |
| 12 | 2 | 2 x 4 = 8 | 8 |
| 14 | 3 | 3 x 4 = 12 | 12 |
| 16 | 0 | 0 x 4 = 0 | 0 |
| 18 | 1 | 1 x 4 = 4 | 4 |

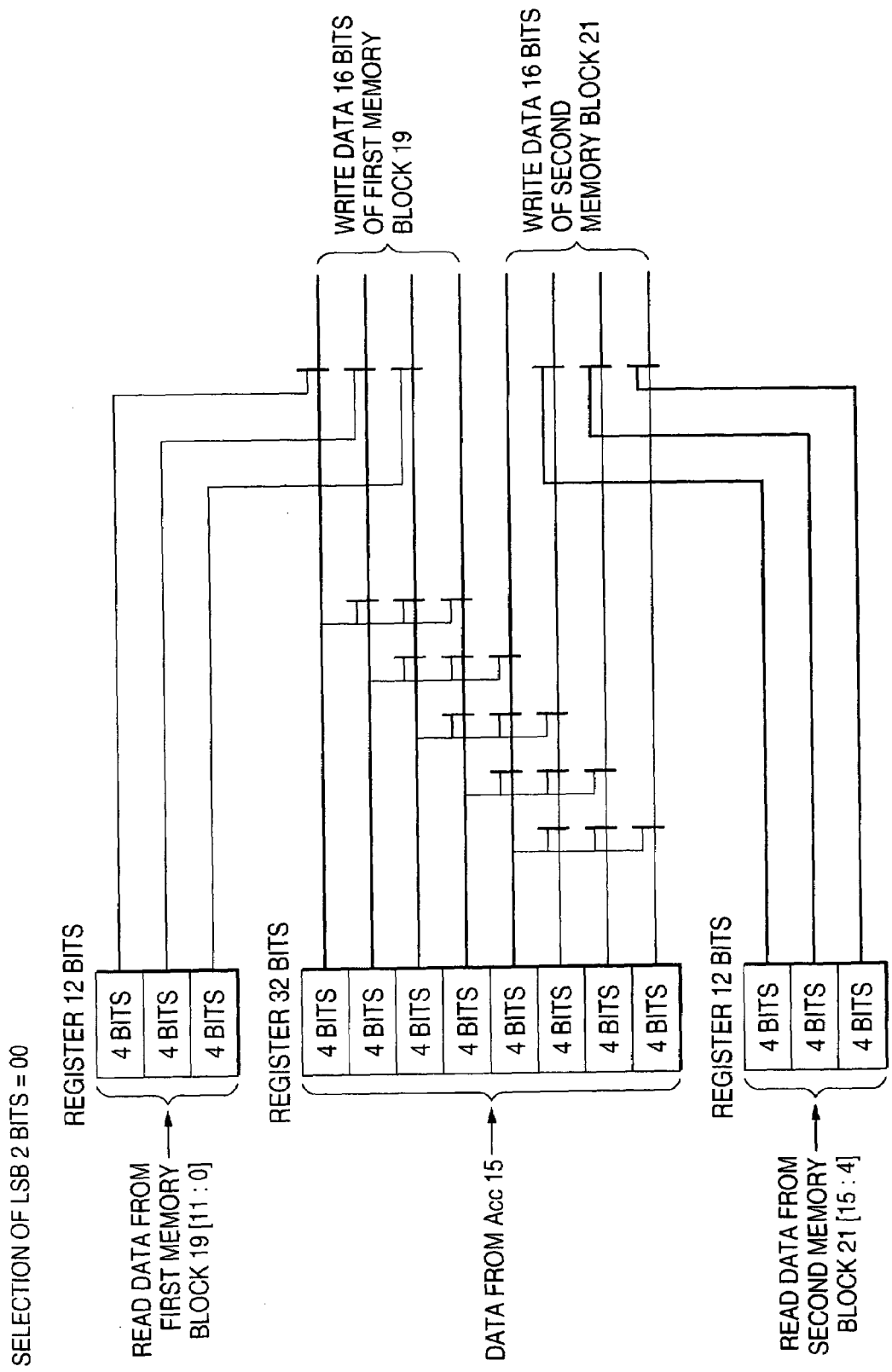

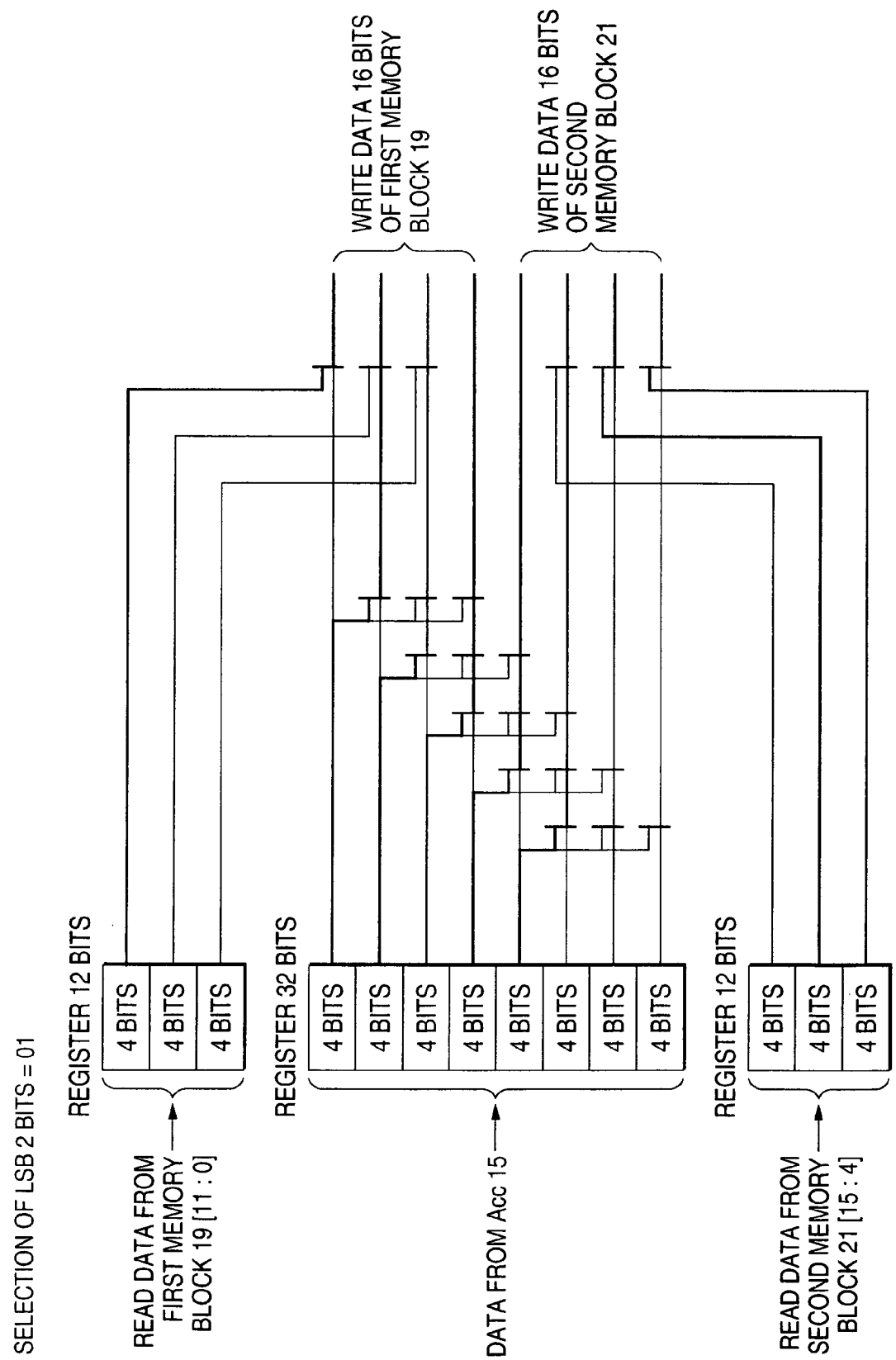

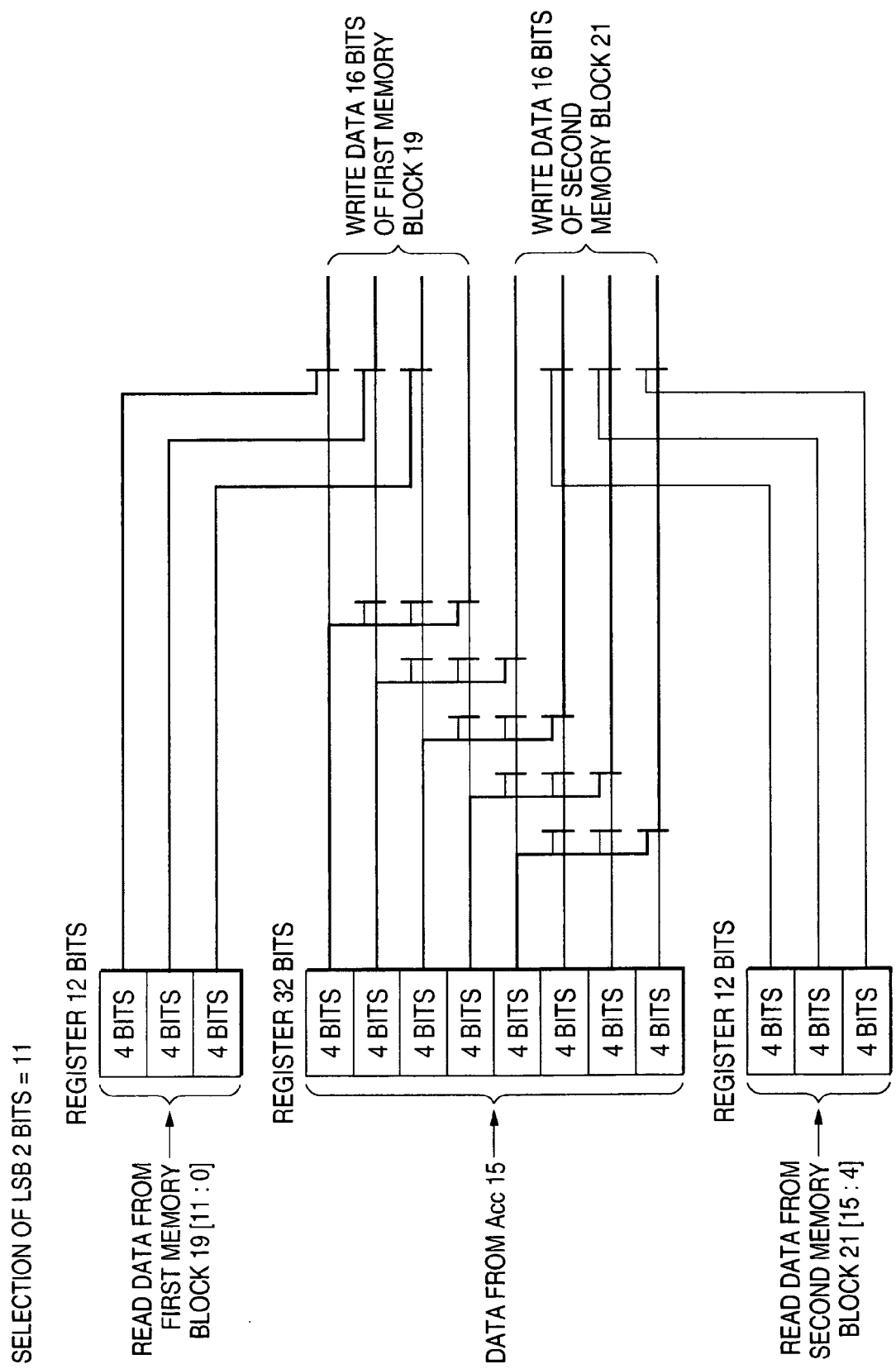

DATA PROCESSING APPARATUS

BACKGROUND OF THE INVENTION

The present invention relates to a data processing apparatus for executing the arithmetic processing of data in which the bit width of one word is not standard $2^n$ bits.

Some of apparatuses for outputting or processing images, voices etc. employ data in which the bit width of one word is not standard $2^n$ bits, in order to enhance the qualities of the images and the voices or to affix additional information to the images and voices. Such apparatuses include, for example, a so-called "third-generation portable telephone", and an information processing apparatus which generates image data having a plurality of gradations. A digital signal processor (hereinbelow, termed "DSP") or any other data processing apparatus is installed in such an apparatus, whereby various items of arithmetic processing are executed by converting the bit width of one word into standard $2^n$ bits.

Now, a presented data processing apparatus will be described by taking as an example the DSP which is installed in the third-generation portable telephone.

Using the DSP, the third-generation portable telephone extracts the signals of several specified bandwidths from within a broad frequency bandwidth in order to favorably communicate at all times. Besides, from among the specified bandwidths, one of high reception sensitivity is especially selected for the communications. Incidentally, on this occasion, the DSP usually extracts the signals of the specified bandwidths by employing a technique called "digital matched filter (hereinbelow, termed "DMF") algorithm", but the technique itself is not pertinent to the subject matter of the present invention and shall be omitted from detailed description here.

In the presented data processing apparatus, data of 16 bits are outputted from a memory to an ALU atone time. However, data for use in arithmetic processing correspond only to 10 of the 16 bits. Therefore, the presented data processing apparatus wastefully outputs the data of 6 bits to the ALU at one time.

Moreover, the ALU has a built-in arithmetic unit of 32-bit width, but it uses only 10 bits in the 32-bit width. Therefore, the presented data processing apparatus wastes the arithmetic unit in correspondence with a 22-bit width.

With the intention of solving the drawbacks, there has been proposed a technique wherein the width of a bus is doubled (to 32 bits) so as to output data of 32 bits from the memory to the ALU, and the arithmetic unit is divided into higher-order 16 bits and lower-order 16 bits so as to arithmetically process the data in parallel. Even with this technique, however, the memory is used in correspondence with only 10 bits in spite of the 16-bit width thereof. Therefore, the presented data processing apparatus wastes 6 bits in the use of the memory.

In this manner, in the case where the arithmetic processing is done using the data of which one word does not have the standard bit width, the presented data processing apparatus has the problem that, since a reserved part (free area) is arranged between I-part data and R-part data, the built-in arithmetic unit of the ALU and the memory are wastefully used, so the processability of the arithmetic unit and the capacity of the memory cannot be effectively utilized.

SUMMARY OF THE INVENTION

The present invention may provide a data processing apparatus which can effectively utilize an arithmetic processability and a memory capacity.

A data processing apparatus according to the present invention includes address generation circuit, an address translation circuit, a selection circuit, a memory, a shifter, an ALU and a mixing circuit. The address generation circuit generates a logical address for data including 10 bit imaginary part, 10 bit real part and 12 bit reserved part. The address translation circuit translates the logical address into a physical address for data including 16 successive bits of the imaginary part and the real part. The selection circuit generates a selection signal in response to the logical address. The memory for storing 16 bits of data in accordance with the physical address. The shifter shifts the received data from the memory in response to the selection signal. The ALU processes an arithmetic operation in response to the shifter output. The mixing circuit mixes the data received from the memory and the ALU and outputs the mixed data to the memory.

BRIEF DESCRIPTION OF THE DRAWINGS

FIG. 2 is a diagram showing a logical address space;
FIG. 3 is a diagram showing a physical address space;
FIG. 4 is a table showing the relations of logical addresses to physical addresses;
FIG. 5 is a table showing shift magnitudes;
FIG. 7 is a diagram showing the shift operation of the mixing circuit in an example;
FIG. 8 is a diagram showing the shift operation of the mixing circuit in another example;
and
FIG. 9 is a diagram showing the shift operation of the mixing circuit in still another example.

DETAILED DESCRIPTION OF THE INVENTION

Figure 1:
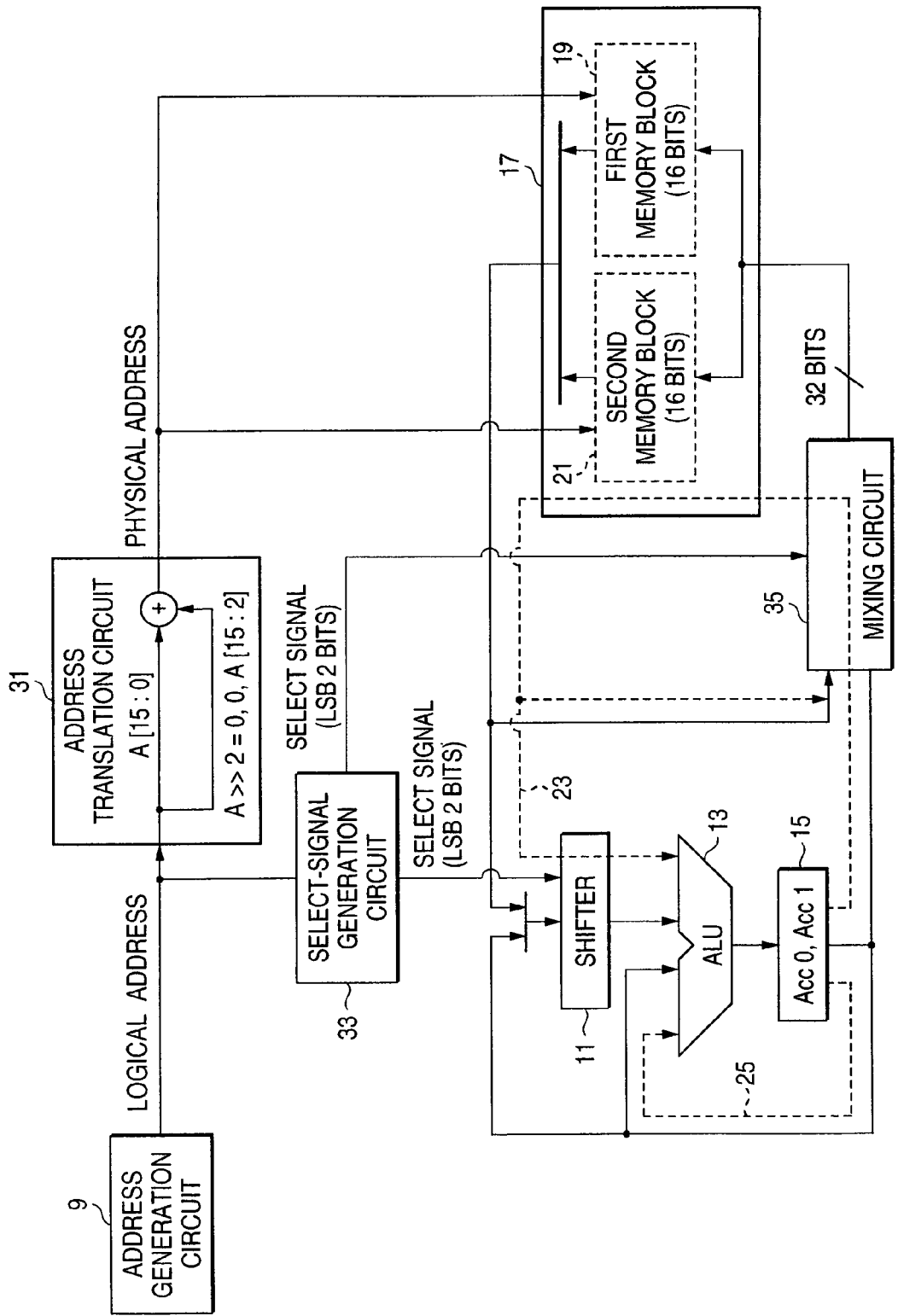
FIG. 1 is a diagram showing the construction of a data processing apparatus according to the present invention.

Now, an embodiment of the present invention will be described with reference to the drawings by taking as an example a DSP which is installed in a third-generation portable telephone Incidentally, the drawings illustrate the invention merely schematically to the extent that it can be understood. Besides, throughout the drawings, the same reference numerals are assigned to common constituents, which shall not be described repeatedly.

Figure 6:
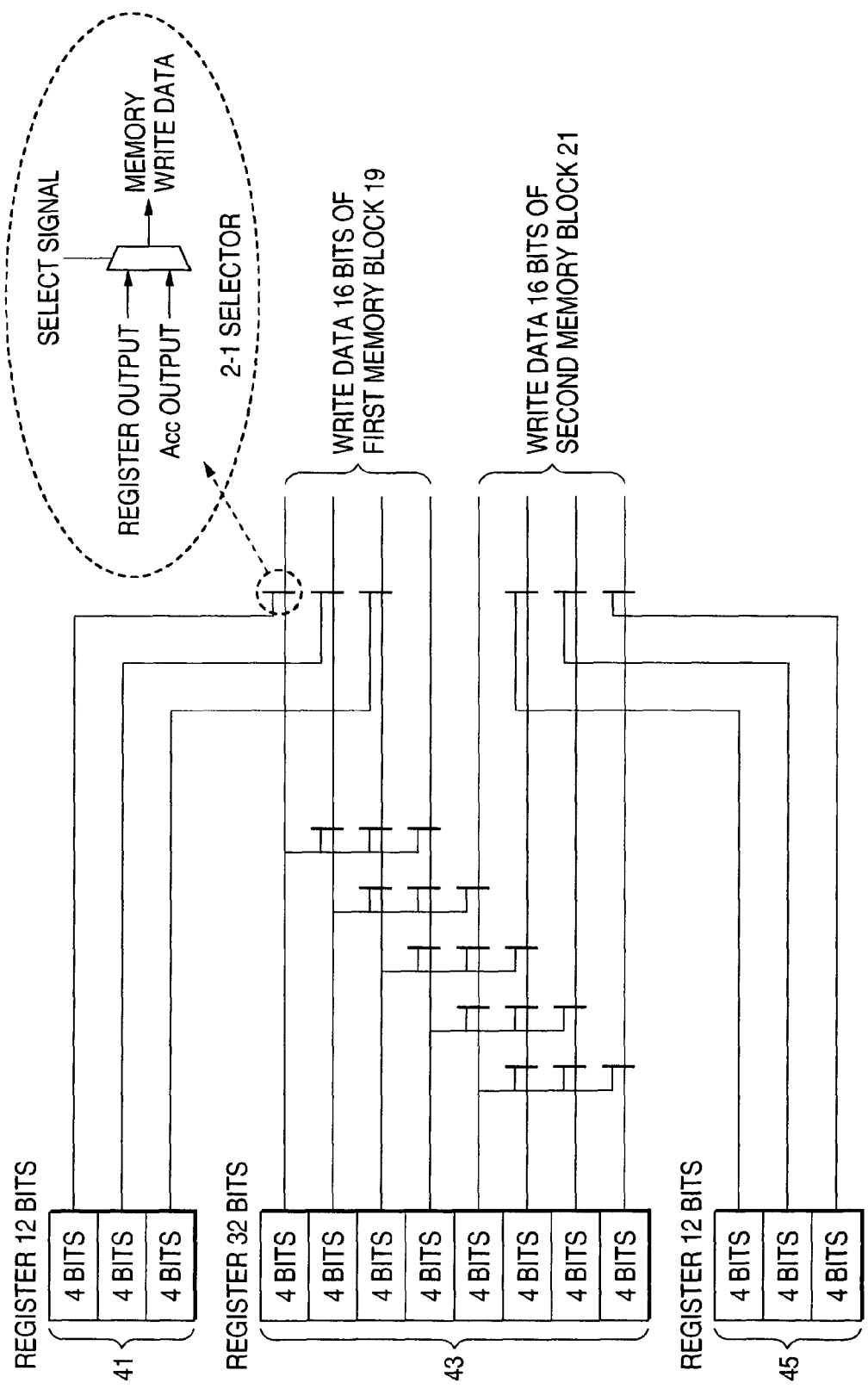
FIG. 6 is a diagram showing the construction of a mixing circuit.

FIG. 1 is a diagram showing the construction of a data processing apparatus according to the present invention, FIG. 2 is a diagram showing a logical address space, FIG. 3 is a diagram showing a physical address space, FIG. 4 is a table showing the relations of logical addresses to physical addresses, FIG. 5 is a table showing shift magnitudes, FIG. 6 is a diagram showing the construction of a mixing circuit, and FIGS. 7–9 are diagrams each showing the shift operation of the mixing circuit.

Incidentally, the data processing apparatus (namely, DSP) according to this embodiment keeps even-numbered addresses stored in a first memory block 19 and odd-numbered addresses stored in a second memory block 21. Therefore, the DSP can simultaneously access the first memory block 19 and the second memory block 21, and a memory 17 can output data of 32 bits at one time.

The DSP shown in FIG. 1 is such that an address translation circuit 31, a select-signal generation circuit 33 and a mixing circuit 35 are added to a presented construction.

In this embodiment, a data space to be handled by an ALU 13 (hereinbelow, termed "logical address space") and a data space on the memory 17 (hereinbelow, termed "physical address space") are distinguished and processed. Herein, the address translation circuit 31 is disposed in order to facilitate translation from an address on the logical address space (hereinbelow, termed "logical address") into an address on the physical address space (hereinbelow, termed "physical address").

Besides, regarding data read out by the ALU 13, only parts of data referred to must be rewritten. By way of example, in a case where the ALU 13 has read out the data of the first line, a processed result generated by the ALU 13 is stored in the first line. On this occasion, I-part data I(1) and R-part data R(1) are required for the next arithmetic processing and therefore need to be temporarily saved. Therefore, the mixing circuit 35 which saves parts of the data referred to, and which merges them with the processed result of the ALU 13 so as to write back the merged result into the memory 17 is disposed in this embodiment.

Further, arithmetic processing should desirably be easily executed by the ALU 13. In this embodiment, therefore, it is permitted to easily calculate shift magnitudes from logical addresses in order that the positions of data for use in the arithmetic processing may become constant.

The address translation circuit 31 generates an address which actually uses in reading out data from the memory 17 or writing data into the memory 17, in such a way that a value is added to an address outputted from a memory address generation circuit 9, the value being obtained by shifting the outputted address 2 bits. Incidentally, the address outputted from the address generation circuit 9 is called "logical address" in this embodiment, and the generated address "physical address".

The select-signal generation circuit 33 generates a select signal which designates the adjustment of a phase by shifting data predetermined bits or which designates the changeover of an internal circuit, and it supplies the select signal to a shifter 11 and the mixing circuit 35. Upon receiving the select signal, the shifter 11 adjusts the phase by shifting the data predetermined bits so that the head of the data may become the 0th bit. Also, upon receiving the select signal, the mixing circuit 35 adjusts the phase so that the data may come to the original bit position (bit position in the case where the data was read out from the memory 17). By the way, in this embodiment, 2 bits on the LSB side of the data are employed as the select signal.

Logical addresses are so constructed that, as shown in FIG. 2, I-part data and R-part data each being of 10-bit width succeed, followed by a reserved part of 12-bit width. On the other hand, physical addresses are so constructed that, as shown in FIG. 3, I-part data and R-part data each being of 10-bit width succeed, followed by I-part data and R-part data.

In the physical addresses, the reserved part of 12-bit width is deleted, and the I-part data and the R-part data each being of 10-bit width are inserted in an area where the reserved part existed. Therefore, the logical addresses and the physical addresses are in the following relationship:

Each physical address has such a value that a value obtained by shifting the corresponding logical address 2 bits is added to this logical address.

FIG. 4 shows the offset magnitudes between logical addresses and physical addresses. More specifically, it shows, for example, the relation between an address where the head of I-part data in the logical address space exists and an address where the head of I-part data in the physical address space as corresponds to the former address exists. The address where the head of the I-part data in the physical address space exists, changes in accordance with the address where the head of the I-part data in the logical address space exists. By way of example, as shown in FIG. 4, addresses 0, 2, 4, 6, 8, 10, 12, 14, 16, 18 . . . where the heads of I-part data I0–I9 in the logical address space exist become addresses 0, 1, 2, 3, 5, 6, 7, 8, 10, 11 . . . in the physical address space. In terms of a calculation formula, the relations are expressed by the following equation (1):

$$A=(a/2)+[(a/2)/4] \quad (1)$$

Here, letter A denotes a physical address, letter a denotes a logical memory address in the case where data of 32-bit width as consists of an imaginary part of 10-bit width, a real part of 10-bit width and a reserved part of 12-bit width is stored in a memory of 16-bit width, and symbol [x] denotes the Gaussian symbol which signifies the maximum integer not exceeding x.

Besides, FIG. 5 shows the relations between logical addresses and shift magnitudes from the reference positions of data referred to (in case of the example shown in FIG. 5, the head of I-part data In at each logical address becomes the 0th bit). More specifically, it shows, for example, the relation of the shift magnitude between the bit position of the head of I-part data in the logical address space and the bit position of the head of I-part data in the physical address space. The shift magnitude changes depending upon an address where the head of the I-part data in the logical address space exists. By way of example, as shown in FIG. 5, bit positions 0, 2, 4, 6, 8, 10, 12, 14, 16, 18 . . . of the heads of the I-part data I0–I9 in the logical address space become addresses 0, 4, 8, 12, 0, 4, 8, 12, 0, 4 . . . in the physical address space. In terms of a calculation formula, the relations are expressed by the following equation (2):

$$B=(a/2)-4[(a/2)/4] \quad (2)$$

Here, letter B denotes a bit position in the physical address space, letter a denotes the logical memory address in the case where the data of 32-bit width as consists of the imaginary part of 10-bit width, the real part of 10-bit width and the reserved part of 12-bit width is stored in the memory of 16-bit width, and symbol [x] denotes the Gaussian symbol which signifies the maximum integer not exceeding x.

Incidentally, this relationship corresponds to the quadruple of 2 bits on the side of the least significant bit (hereinbelow, termed "LSB") of the logical address.

This relationship will be explained below as to a case, for example, the DSP reads out data consisting of I-part data I6 and R-part data R6.

More specifically, the head of the data consisting of the I-part data 16 and R-part data R6 exists at a logical address 12 on the logical address space, but it exists at a physical address 7 on the physical address space. Therefore, the DSP calculates on the basis of the relations of physical addresses to logical addresses as shown in FIG. 4, the fact that the head of the data consisting of the I-part data 16 and R-part data R6 exists at the physical address 7 on the physical address space, and it reads out the data consisting of the I-part data 16 and R-part data R6, from the physical address 7 of the memory 17.

On this occasion, in order to facilitate arithmetic processing in the ALU 13, the DSP adjusts a phase in such a way that the data to be read out from the memory 17 is shifted predetermined bits on the basis of the relations of shift magnitudes to logical addresses as shown in FIG. 5. By way of example, the head of the I-part data I6 exists at the position of the 8th bit as reckoned from the 0th bit of the physical address 7, so that the DSP shifts the I-part data I6 rightwards to the amount of 8 bits by the shifter 11.

The address translation circuit 31 translates the address of data which is to be read out from the memory 17 or to be stored in the memory 17, in accordance with such relationships. Besides, the select-signal generation circuit 33 determines a position where a part for use in the arithmetic processing is extracted from within the data read out from the memory 17, in accordance with such relationships.

The mixing circuit 35 mixes an arithmetically processed result outputted from the side of the ALU 13 along a first route 23, and data outputted from the side of the memory 17 along a third route 23'.

The operation of the mixing circuit 35 will be explained below.

As shown in FIG. 6, the mixing circuit 35 is constructed like, so to speak, an assembly of registers and selectors.

More specifically, the mixing circuit 35 includes a first register group 41 which consists of three registers each having a 4-bit width and to which read data [11:0] (that is, data of 12 bits of bit positions 0–11) read out from the first memory block 19 is inputted, a second register group 43 which consists of eight registers each having a 4-bit width and to which data of 32-bit width outputted from the side of the ALU 13 (or an Acc 15) is inputted, and a third register group 45 which consists of three registers each having a 4-bit width and to which read data [15:4] (that is, data of 12 bits of bit positions 4–15) read out from the second memory block 21 is inputted.

Besides, in the mixing circuit 35, the three registers of the first register group 41 and three registers on the side of the most significant bit (hereinbelow, termed "MSB") in the second register group 43 are connected through selectors. Further, every four of the registers in the second register group 43, from the LSB side to the MSB side in this group, are connected through selectors. Still further, three registers on the LSB side in the second register group 43 and the three registers of the third register group 45 are connected through selectors. Herein, each selector is connected with the select-signal generation circuit 33 so as to receive a select signal therefrom. In this embodiment, 2 bits on the LSB side of a logical address are employed as the select signal. When supplied with the 2 bits on the LSB side of the logical address from the select-signal generation circuit 33, the selector changes-over a circuit in accordance with the content of the select signal.

The mixing circuit 35 operates as shown in FIGS. 7–9 by way of example.

OPERATING EXAMPLE 1

Case where DSP has Accessed Logical Address 0
(I0, R0)

In a case where the DSP has accessed a logical address 0 (I0, R0), the values of 2 bits on the LSB side of the logical address are "00". Therefore, a physical address becomes 0 in view of the relations of physical addresses to logical addresses as shown in FIG. 4. On this occasion, as shown in FIG. 7, the mixing circuit 35 mixes outputs from the first—fifth registers on the MSB side of the second register group 43 and outputs from the three registers of the third register group 45.

By the way, in the operating example 1, the DSP operates as stated below.

First, the DSP reads out I-part data I0 and R-part data R0 from the physical addresses 0 and 1 of the first and second memory blocks 19, 21. The shift magnitude of the shifter 11 on this occasion becomes 0 because the values of the 2 bits on the LSB side of the logical address are "00". Therefore, the I-part data I0 and R-part data R0 which are read data are directly inputted to the ALU 13. On the other hand, also in the mixing circuit 35, the values of the 2 bits on the LSB side of the logical address become "00", and data (1) which are parts of the read data and which are to be saved are generated. The data (1) which are generated on this occasion become I1[9:0] and R1[1:0]. Since the data I1[9:0] and R1[1:0] will be used at later arithmetic processing, those 4th–15th bits of the second memory block 21 at which the data I1[9:0] and R1[1:0] are stored must not be overwritten at this stage.

Subsequently, the DSP executes arithmetic processing between the I-part data I0 as well as the R-part data R0 and another data, thereby to generate update data (2). Thereafter, the DSP outputs the update data (2) of the I-part data I0 and R-part data R0 from the Acc 15. Subsequently, the mixing circuit 35 combines the data (1) and the update data (2), thereby to generate overwriting write data (3) for the first and second memory blocks 19, 21.

OPERATING EXAMPLE 2

Case where DSP has Accessed Logical Address 1
(I1, R1)

In a case where the DSP has accessed a logical address 1 (I1, R1), the values of 2 bits on the LSB side of the logical address are "01". Therefore, a physical address becomes 1 in view of the relations of physical addresses to logical addresses as shown in FIG. 4. On this occasion, as shown in FIG. 8, the mixing circuit 35 mixes an output from the first register on the MSB side of the first register group 41, outputs from the first—fifth registers on the MSB side of the second register group 43 and outputs from the first—second registers on the LSB side of the third register group 45.

By the way, in the operating example 2, the DSP operates as stated below.

First, the DSP reads out I-part data I1 and R-part data R1 from the physical addresses 1 and 2 of the first and second memory blocks 19, 21. The shift magnitude of the shifter 11 on this occasion becomes 4 because the values of the 2 bits on the LSB side of the logical address are "01". Therefore, values obtained by shifting the I-part data I1 and R-part data R1 which are read data, rightwards to the amounts of 4 bits, are inputted to the ALU 13. On the other hand, also in the mixing circuit 35, the values of the 2 bits on the LSB side of the logical address become "01", and data (4) which are parts of the read data and which are to be saved are generated. The data (4) which are generated on this occasion become I2[7:0] and R2[9:0]. Since the data I2[7:0] and R2[9:0] will be used at later arithmetic processing, those 8th–15th bits of the first memory block 19 and those 0th–11th bits of the second memory block 21 at which the data I2[7:0] and R2[9:0] are stored must not be overwritten at this stage.

Subsequently, the DSP executes arithmetic processing between the I-part data 11 as well as the R-part data R1 and another data, thereby to generate update data (5). Thereafter, the DSP outputs the update data (5) of the I-part data I1 and R-part data R1 from the Acc 15. Subsequently, the mixing circuit 35 combines the data (4) and the update data (5), thereby to generate overwriting write data (6) for the first and second memory blocks 19, 21.

OPERATING EXAMPLE 3

Case where DSP has Accessed Logical Address 3
(I3, R3)

In a case where the DSP has accessed a logical address 3 (I3, R3), the values of 2 bits on the LSB side of the logical address are "11". Therefore, a physical address becomes 3 in view of the relations of physical addresses to logical addresses as shown in FIG. 4. On this occasion, as shown in FIG. 9, the mixing circuit 35 mixes outputs from the three registers of the first register group 41 and outputs from the first—fifth registers on the MSB side of the second register group 43.

By the way, in the operating example 3, the DSP operates as stated below.

First, the DSP reads out I-part data I3 and R-part data R3 from the physical addresses 3 and 4 of the first and second memory blocks 19, 21. The shift magnitude of the shifter 11 on this occasion becomes 12 because the values of the 2 bits on the LSB side of the logical address are "11". Therefore, values obtained by shifting the I-part data I3 and R-part data R3 which are read data, rightwards to the amounts of 12 bits, are inputted to the ALU 13. On the other hand, also in the mixing circuit 35, the values of the 2 bits on the LSB side of the logical address become "11", and data (7) which are parts of the read data and which are to be saved are generated. The data (7) which a regenerated on this occasion become I4[9:0] and R4[5:0]. Since the data I4[9:0] and R4[5:0] will be used at later arithmetic processing, those 0th–15th bits of the second memory block 21 at which the data I4[9:0] and R4[5:0] are stored must not be overwritten at this stage.

Subsequently, the DSP executes arithmetic processing between the I-part data I3 as well as the R-part data R3 and another data, thereby to generate update data (8). Thereafter, the DSP outputs the update data (8) of the I-part data I3 and R-part data R3 from the Acc 15. Subsequently, the mixing circuit 35 combines the data (7) and the update data (8), thereby to generate overwriting write data (9) for the first and second memory blocks 19, 21.

The mixing circuit 35 operates in this manner. Therefore, the DSP need not perform unnecessary shift processing for the reason that, in case of the arithmetic processing, data to be arithmetically processed are stored in the same bit positions. It is accordingly possible to heighten the run speed of a program.

The present invention described above has the advantage that data of 10-bit width can be formed without any free area even in a memory of 16-bit width, so the quantity of use of the memory can be enhanced. Besides, since the present invention is incarnated merely by adding the address translation circuit 31, the select-signal generation circuit 33 and the mixing circuit 35 to the presented apparatus, a circuit scale is enlarged little.

Incidentally, the present invention is not restricted to the foregoing aspects of performance, but various applications and modifications are considered within a scope not departing from the subject matter of the present invention.

The present invention thus far described has the advantage that data of 10-bit width can be formed without any free area even in a memory of 16-bit width, so the quantity of use of the memory can be enhanced.

What is claimed is:

1. A data processing apparatus comprising:
    an address generation circuit generating a logical address for data including 10 bits of an imaginary part, 10 bits of a real part and 12 bits of a reserved part;
    an address translation circuit translating the logical address into a physical address for data including 16 successive bits of the imaginary part and the real part;
    a selection circuit generating a selection signal in response to the logical address;
    a memory for storing 16 bits of data in accordance with the physical address and outputting the stored data;
    a shifter receiving the data from the memory and shifting the received data in response to the selection signal;
    an ALU processing an arithmetic operation in response to an output of the shifter and a processing result thereof; and
    a mixing circuit mixing the data received from the memory and the processing result and outputting the mixed data to the memory.

2. A data processing apparatus according to claim 1, wherein a relationship between the physical address A and the logical address a is as follows:

$$A=(a/2)+[(a/2)/4]$$

wherein [x] means a Gaussian symbol signifying a maximum integer not exceeding x.

3. A data processing apparatus according to claim 1, wherein a relationship between a bit position B within the physical address and the logical address a is as follows:

$$B=(a/2)-4[(a/2)/4]$$

wherein [x] means a Gaussian symbol signifying a maximum integer not exceeding x.

4. A data processing apparatus according to claim 1, wherein the memory including a plurality of memory blocks.

5. A data processing apparatus according to claim 1, wherein the mixing circuit includes a plurality of registers and a plurality of selectors operating in response to the select signal.

6. A data processing apparatus according to claim 5, wherein the resistors are 4 bit registers.

7. A data processing apparatus comprising:
    an address generation circuit generating a logical address for 32 bit width data including 10 bits of an imaginary part, 10 bits of a real part and 12 bits of a reserved part;
    an address translation circuit translating the logical address into a physical address for data including 16 successive bits of the imaginary part and the real part;
    a selection circuit generating a selection signal in response to the logical address;
    a memory, for storing 16 bit width data in accordance with the physical address and outputting the stored data;
    a shifter receiving the data from the memory and shifting the received data in response to the selection signal;
    an ALU processing an arithmetic operation in response to an output of the shifter and a processing result thereof;

an accumulator receiving the processing result and outputting the accumulated result; and a mixing circuit mixing the data received from the memory and the accumulated result and outputting the mixed data to the memory.

8. A data processing apparatus according to claim 7, wherein a relationship between the physical address A and the logical address a is as follows:

$$A=(a/2)+[(a/2)/4]$$

wherein [x] means a Gaussian symbol signifying a maximum integer not exceeding x.

9. A data processing apparatus according to claim 7, wherein a relationship between a bit position B within the physical address and the logical address a is as follows:

$$B=(a/2)-4[(a/2)/4]$$

wherein [x] means a Gaussian symbol signifying a maximum integer not exceeding x.

10. A data processing apparatus according to claim 7, wherein the memory including a plurality of memory blocks.

11. A data processing apparatus according to claim 7, wherein the mixing circuit includes a plurality of registers and a plurality of selectors operating in response to the select signal.

12. A data processing apparatus according to claim 11, wherein the resistors are 4 bit registers.

13. A data processing apparatus according to claim 11, wherein the registers including a first 12 bit register, a second 12 bit register and a 32 bit register.

14. A data processing apparatus according to claim 13, wherein the registers including a plurality of 4 bit registers.

15. A data processing apparatus according to claim 13, wherein the memory including a first memory for storing an odd address data and a second memory for storing an even address data.

16. A data processing apparatus according to claim 15, wherein the first 12 bit register receives data from the first memory, the second 12 bit register receives data from the second memory, and the 32 bit register receives data from the accumulator.

* * * * *